No. 796,193. PATENTED AUG. 1, 1905.
R. F. CROOKE.
SKELETON CAST METAL GLASS MOUNT FOR MAKING SHADES, SCREENS, &c.
APPLICATION FILED APR. 10, 1905.
2 SHEETS—SHEET 1.
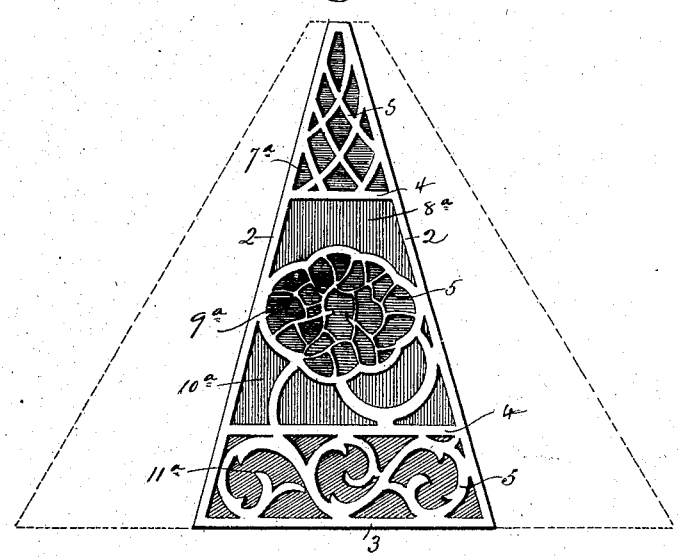
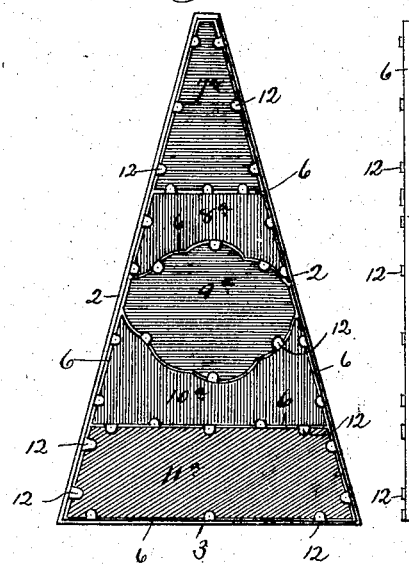
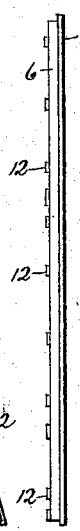
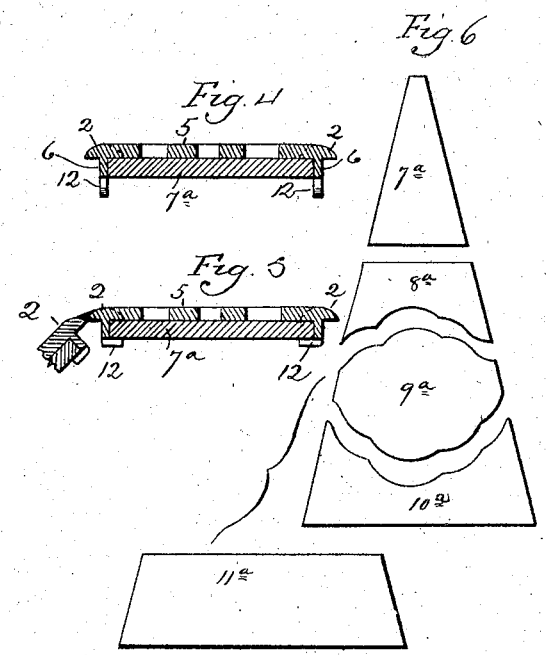

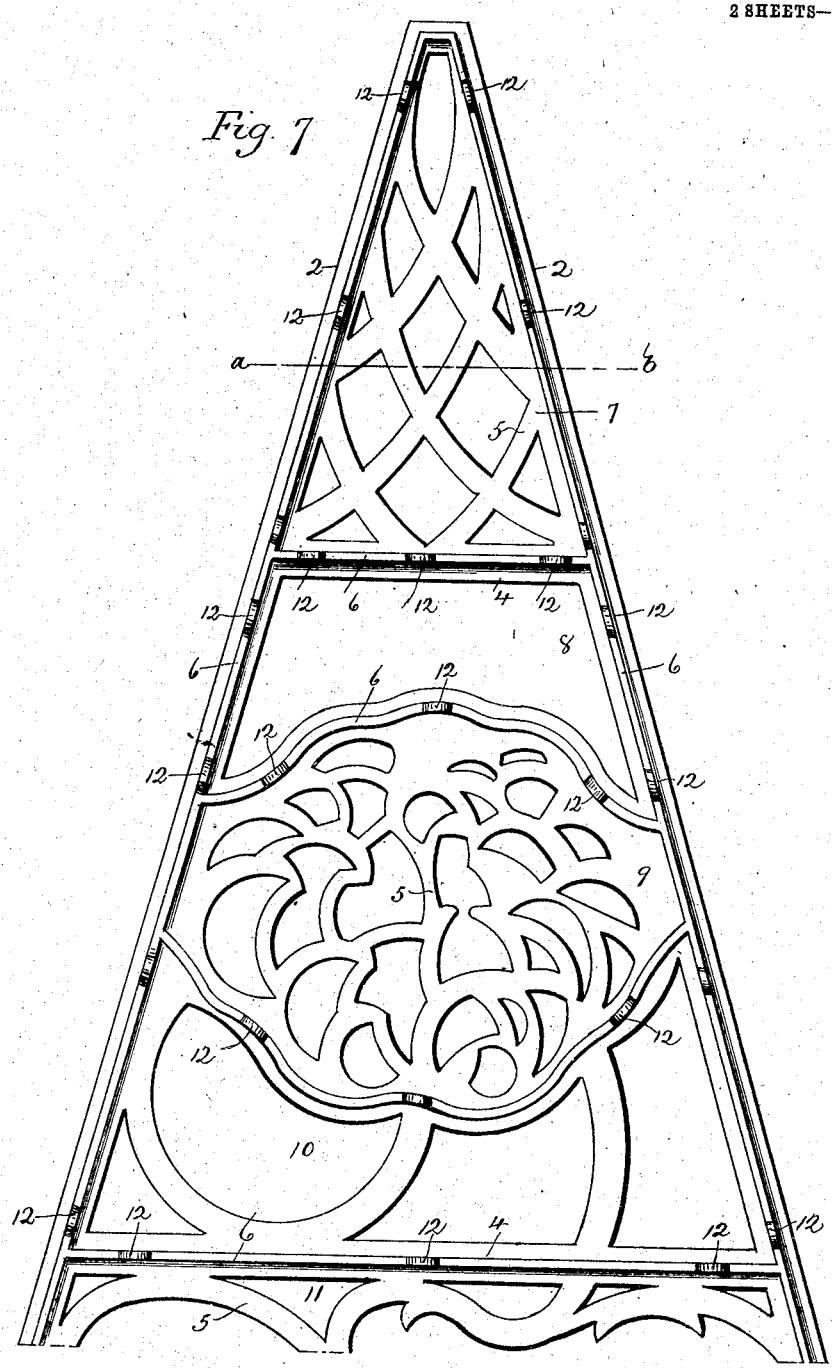

UNITED STATES PATENT OFFICE.

REUBEN F. CROOKE, OF MERIDEN, CONNECTICUT, ASSIGNOR TO THE BRADLEY & HUBBARD MFG. CO., OF MERIDEN, CONNECTICUT, A CORPORATION.

SKELETON CAST-METAL GLASS-MOUNT FOR MAKING SHADES, SCREENS, &c.

No. 793,193. Specification of Letters Patent. Patented Aug. 1, 1905.

Application filed April 10, 1905. Serial No. 254,791.

*To all whom it may concern:*

Be it known that I, REUBEN F. CROOKE, a citizen of the United States, residing at Meriden, in the county of New Haven and State of Connecticut, have invented a new and useful Improvement in Skeleton Cast-Metal Glass-Mounts for Making Lamp-Shades, Screens, &c.; and I do hereby declare the following, when taken in connection with the accompanying drawings and the numerals of reference marked thereon, to be a full, clear, and exact description of the same, and which said drawings constitute part of this specification, and represent, in—

Figure 1, a view in elevation of one mount or section of a lamp-shade constructed in accordance with my invention, the outline of the shade being shown by broken lines; Fig. 2, a view in rear elevation of one of my improved skeleton cast-metal glass-mounts, shown as glazed or with the several pieces of glass in place therein; Fig. 3, an edge view thereof; Fig. 4, a view in transverse section on the line $a\,b$ of Fig. 7, with the glass in place, but with the retaining-fingers not turned down; Fig. 5, a view in transverse section on the line $a\,b$ of Fig. 7, showing the retaining-fingers turned down upon the glass and also showing a portion of the adjoining mount on one side to illustrate the mode of securing the mounts together; Fig. 6, a view showing the full complement of pieces of glass for any one of the mounts of the particular design shown herein; Fig. 7, a view in inside elevation of one of the mounts drawn to full size, but with its lower end broken away and shown as unglazed.

Heretofore in making lamp-shades, screens, &c., of the class to which my improvement relates the pieces of ornamental glass have been built up into a design by the use of metal bindings forming a frame and corresponding to the lines of "leading," so called, in stained-glass windows. This method of producing lamp-shades and kindred articles is not only very expensive, but is open to the objection that in case a piece of the glass is cracked or broken it cannot ordinarily be replaced except by returning the shade to the maker of it or sending it to an expert in the art.

The object of my invention is to produce at a greatly-reduced cost for manufacture lamp-shades and kindred articles in which the metal frames or mounts for the glass are constructed so as to enable broken pieces to be readily replaced by the owner of the shade, as well as to give great freedom to the designer.

With these ends in view my invention consists in a one-piece skeleton cast-metal glass-mount having certain details of construction and combinations of parts, as will be hereinafter described, and pointed out in the claims.

For the illustration of my invention I have shown it as embodied in a hexagonal lamp-shade composed of six triangular skeleton cast-metal glass-mounts, cast from soft metal and each comprising side bars 2 2 and a bottom bar 3, which establish the general form of the mount, and each comprising also intermediate bars 4 and tracery 5, which latter will vary in form, number, and character, depending upon the design—as, for instance, whether it is geometric, pictorial, floral, arabesque, and so on. The bars 2 and 3 are frame-bars, and the bars 4 design-bars. The side bars 2, the bottom bar 3, and the intermediate bars 4 are formed at a right angle to their inner faces, with flanges 6, which divide, as it were, the inner face or back of the mount into irregular shallow glass-receiving pockets 7, 8, 9, 10, and 11. These pockets are outlined by the bars 2, 3, and 4, as the case may be, and all of them, barring the pocket 8, are virtually subdivided by the tracery 5, which in different parts of the design has different forms, but all of which contributes in the same manner to the total effect by making lines in the design corresponding to the "leads" of stained glass. This tracery 5, it will be understood, is in the plane of the bottoms of the said glass-receiving pockets 7, 8, 9, 10, and 11. The glass, consisting of pieces having the forms designated by $7^a$, $8^a$, $9^a$, $10^a$, and $11^a$, is placed in the respective pockets and retained therein, by preference, by means of fingers 12, formed integral with the flanges 6, and bent down upon the glass, as shown in Fig. 6. If desired, the glass may be held in place in some other way—as, for instance, by cement or by drops of solder—needing no illustration.

The mounts being cast in metal molds are virtually finished when removed therefrom except as to being colored or toned, which may be done before or after they are glazed and before or after they are secured together, as desired. Preferably they will be secured together by soldering the edges of their side bars, as shown by Fig. 5, before they are either colored, toned, or glazed. The glazing is the simplest sort of an operation and does not require skilled labor, involving nothing more than placing the glass in the pockets and bending down the soft-metal retaining-fingers. Of course a great variety may be given to lamp-shades produced from mounts of the same design by varying the color and quality of the glass employed. It is obvious that if any piece of glass is cracked or broken it can be replaced by any one, however unskilled, by simply bending out the retaining-fingers confining that particular piece of glass in place. A new piece of glass is cut to the same form, slipped into the empty pocket, and the fingers bent back again.

It is apparent that my invention is applicable to making lamp-shades, screens, and other similar articles in a great variety of forms limited only by the ability of the maker to cast the mounts. I would therefore have it understood that I do not limit myself to the exact construction shown and described, but hold myself at liberty to make such departures therefrom as fairly fall within the spirit and scope of my invention.

If desired, the mounts may be cast in sand; but that method is more expensive than casting them in metal molds, and mounts cast in sand would be coarser or rougher and would require more finishing than mounts cast in metal molds.

Having fully described my invention, what I claim as new, and desire to secure by Letters Patent, is—

1. A one-piece skeleton cast-metal glass-mount for use in the production of lamp-shades, screens, and kindred articles, the said mount comprising frame-bars and intermediate bars formed upon their inner faces with flanges which break the back or inner face of the mount up into a plurality of shallow glass-receiving pockets in which pieces of glass rest upon the said bars and are confined against edgewise movement by the said flanges.

2. A one-piece skeleton cast-metal glass-mount for use in the production of lamp-shades, screens and kindred articles, the said mount comprising frame-bars and intermediate bars formed with retaining-flanges which break the inner face or back of the mount up into shallow glass-receiving pockets and which are formed with retaining-fingers adapted to be bent for the retention of the glass in the pockets in which the glass rests upon the said bars and is confined against edgewise displacement by the said flanges.

3. A one-piece skeleton cast-metal glass-mount for use in the production of lamp-shades, screens and kindred articles, the said mount comprising frame-bars and intermediate bars formed upon their inner faces with retaining-flanges which break the inner face or back of the mount up into shallow glass-receiving pockets in which pieces of glass rest upon the said bars, and are confined against edgewise movement by the said flanges, and the said mount also comprising integral tracery disposed between the frame-bars and the intermediate bars according to the character of the design and lying in the plane of the mount.

In testimony whereof I have signed this specification in the presence of two subscribing witnesses.

REUBEN F. CROOKE.

Witnesses:
W. I. SMITH,
D. E. DICKINSON.